June 21, 1966     T. A. BATTEN     3,257,255
APPARATUS FOR BUILDING TIRES
Filed Aug. 10, 1962     7 Sheets-Sheet 1
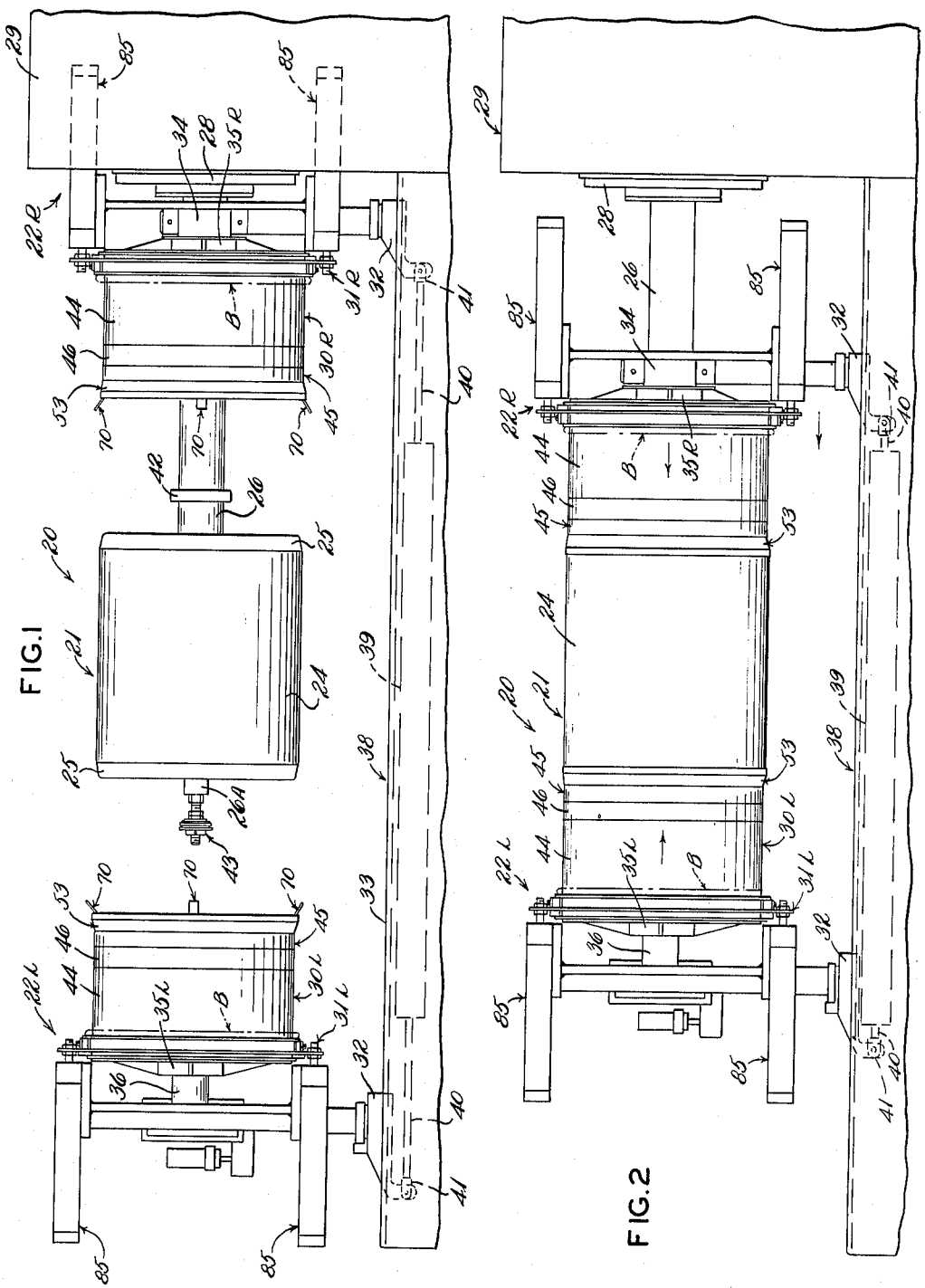

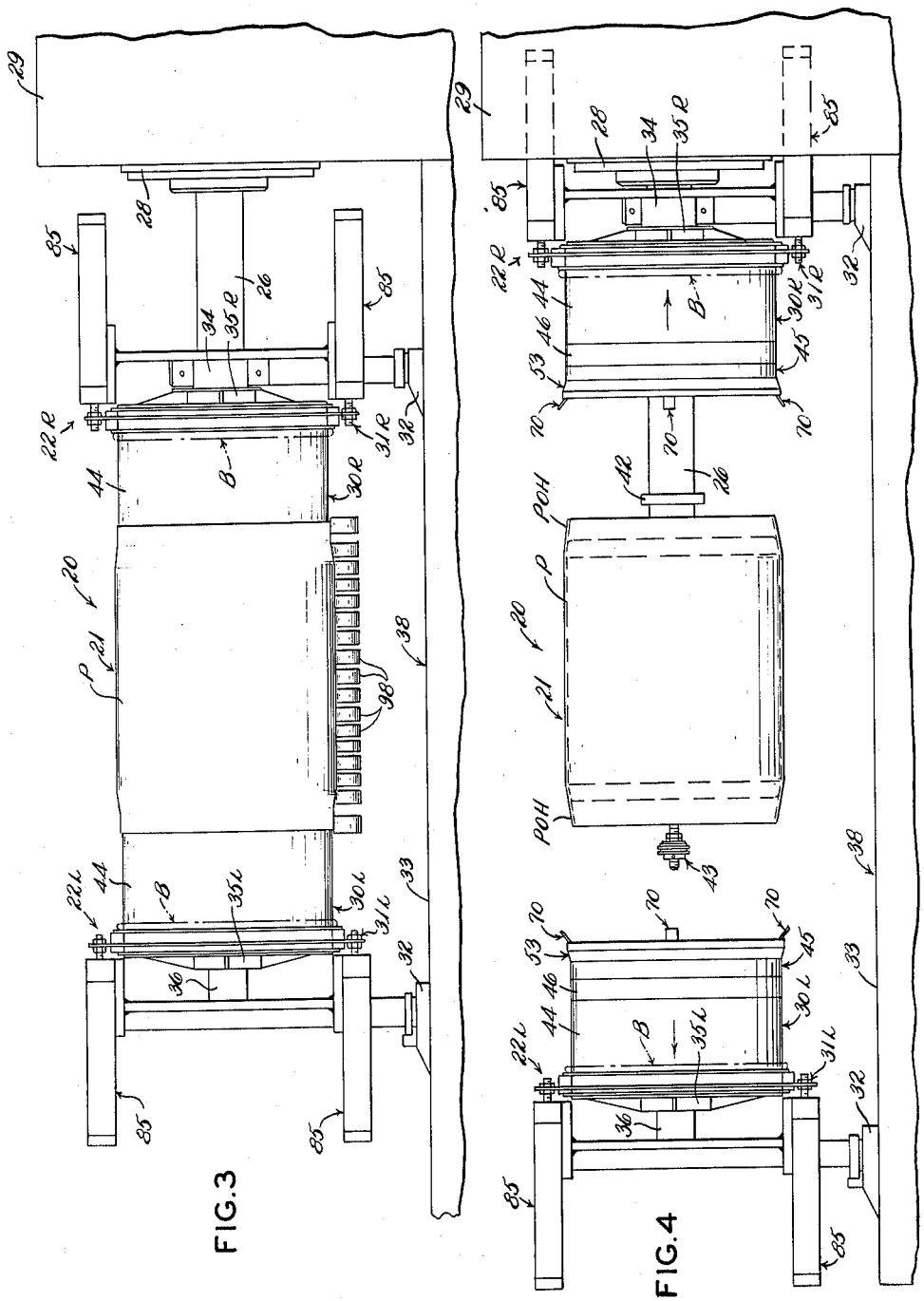

June 21, 1966  T. A. BATTEN  3,257,255
APPARATUS FOR BUILDING TIRES
Filed Aug. 10, 1962  7 Sheets-Sheet 5

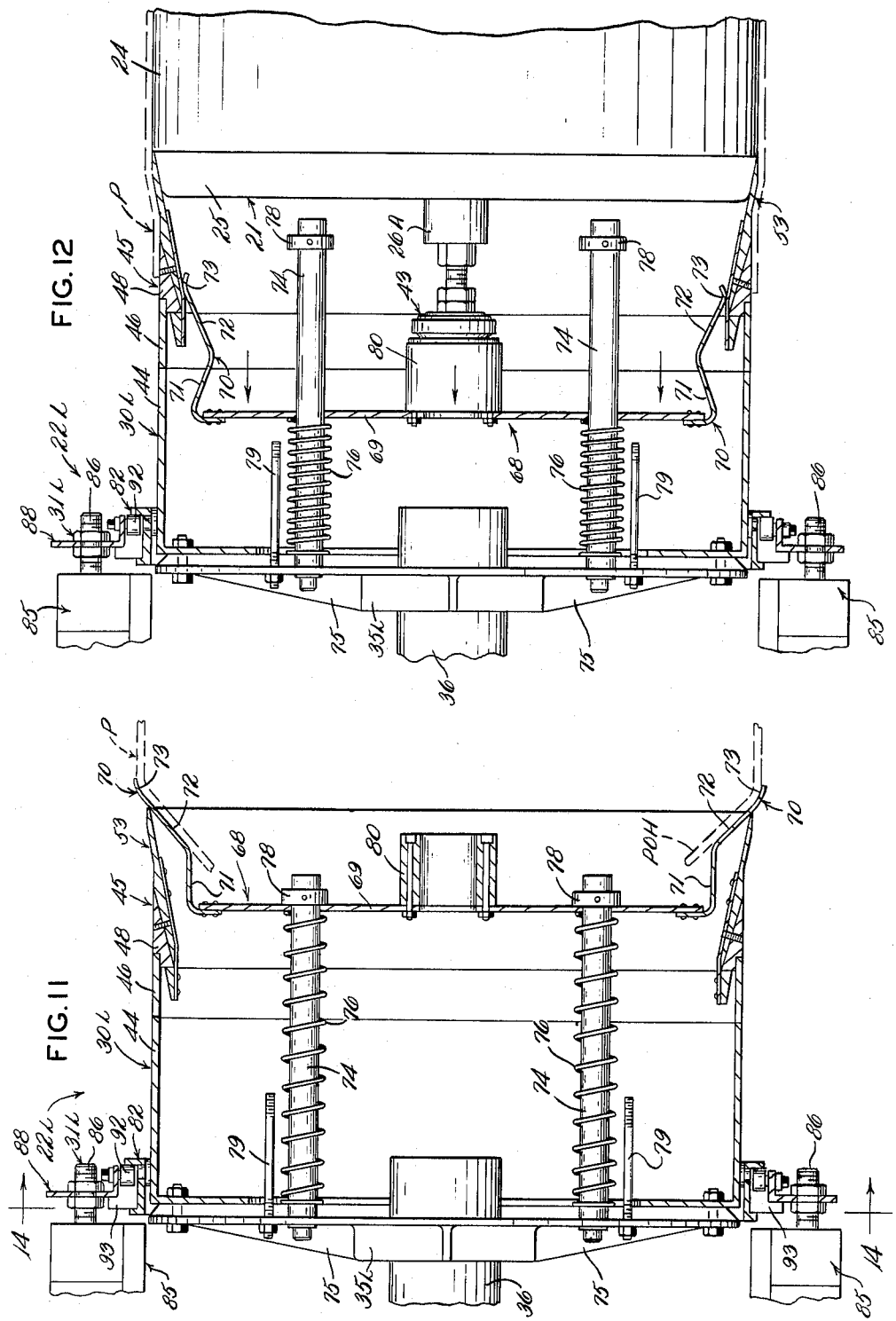

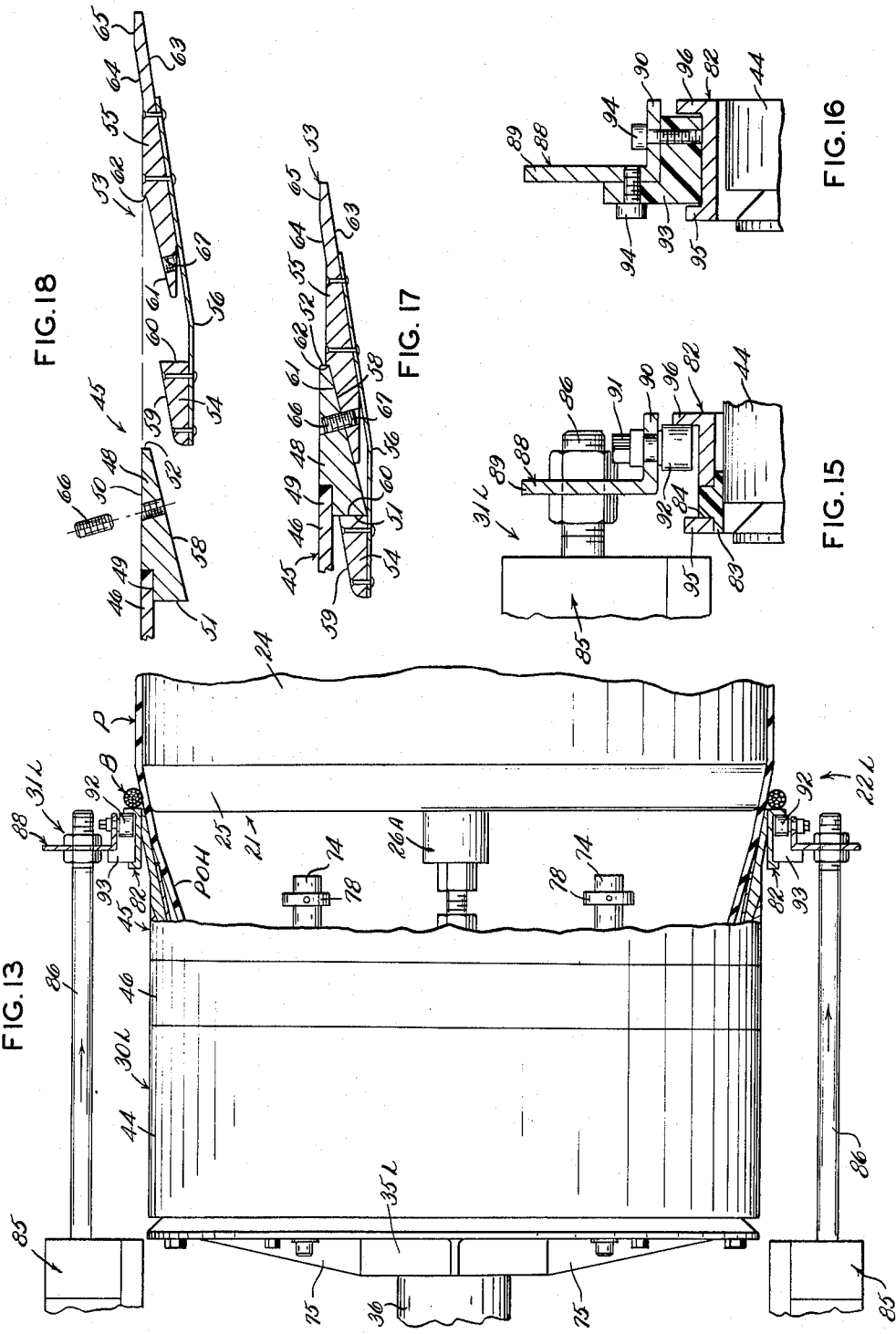

United States Patent Office 3,257,255
Patented June 21, 1966

3,257,255
APPARATUS FOR BUILDING TIRES
Thomas Allen Batten, Silver Lake, Ohio, assignor to The Firestone Tire & Rubber Company, Akron, Ohio, a corporation of Ohio
Filed Aug. 10, 1962, Ser. No. 216,212
11 Claims. (Cl. 156—403)

The present invention relates to ply-down and bead setting method and apparatus for use in the manufacture of tires. More particularly, the invention relates to method and apparatus for turning down and gripping tire fabric plies over the edges of a core or drum on which the plies are wound and for precisely placing the beads over the radially outer surface of the plies on the drum surface.

The "flat band" process of tire manufacture is a method commonly utilized in the industry. The tire is built on the cylindrical surface of a building drum from a number of plies of rubberized tire fabric, the width of the plies being such that the borders or skirts of the plies overhang both peripheral edges of the drum. These outwardly extending "ply overhangs," as they are known in the art, are subsequently wrapped around the inextensible bead cores. In mose cases the ply overhangs, which are turned over the beads, extend for short distances beyond the beads, or they may extend across the full width between the beads to form additional body plies. Further tire body materials are then applied, including whatever additional plies are requisite to the particular tire desired, ending with the tread and sidewall rubbers. When the completed but unvulcanized tire carcass, known in the art as an uncured tire band, is completed, the drum is collapsed to permit the tire band to be removed for subsequent shaping and vulcanizing into tire form.

Heretofore, the conventional operations involving tthe placement of beads have entailed the isolated steps of turning down the ply overhangs around each peripheral edge of the drum, so that the overhangs extend radially inward; feeding the tire beads coaxially against the end faces of the drum; pressing and seating the beads on the radially inwardly extending ply overhangs; retracting the bead setting mechanism; and, finally, turning the plies radially outwardly over and around the beads completely enclosing them.

With the advent of more rigid requirements for precision in methods of tire construction, the accuracy of placement of the beads has become more critical. For example, off-center setting of the beads produces radial run-out, a highly objectional characteristic in tires because of their unbalance and attendant thumping. The previously employed bead setting method, as described above, possesses inherent deficiencies which have hindered consistent achievement of the required degree of precision in bead setting. Moreover, the time-consuming nature of the individual, isolated steps involved in the bead setting operation have presented limitations on the productivity of the machine and operator, thereby increasing the unit cost for tires.

Accordingly, it is one object of the present invention to provide a method and apparatus for winding rubberized fabric into cylindrical shapes and automatically placing the beads on the radially outer surface thereof in exact concentricity with the longitudinal axis of the cylindrical shape of the plies.

It is a further object of the present invention to provide an apparatus for a tire building machine on coaxially separable sections, the mating edges of which are adapted to lie both within a cylinder of tire fabric wound thereon and sequentially to lie one inwardly and one outwardly of the fabric.

It is a still further object of the present invention to provide apparatus for a tire building machine as above, having a bead placing assembly concentrically outwardly of the separable sections and movable axially with respect thereto, to precisely place the beads on the radially outer surface of the wound fabric.

It is a still further object of the present invention to provide a bead placing assembly which has a power transmitting connection between the bead engaging ring and the driving means which prevents binding of the bead engaging ring onto the separable sections.

It is a still further object of the present invention to provide a method and apparatus which increases the efficiency of the tire manufacturing process.

These and other objects, which will become apparent from the following specification, are accomplished by means hereinafter described and claimed.

One preferred embodiment of the present invention is shown by way of example in the accompanying drawings and described in detail without attempting to show all of the various modifications in which the invention might be embodied, the invention being measured by the appended claims and not by the details of the specification.

In general, a ply-down and bead setting apparatus for a tire building machine, according to the present invention, comprises a rotatable, cylindrical drum assembly coaxially interposed between rotatable ply ring assemblies. The ply ring assemblies are axially movable toward the drum assembly and into engagement therewith to permit winding of the fabric around the mating ply ring and drum assembly and are sequentially movable away from and again toward the drum assembly to permit assured precision placement of the bead bundle in contact with the radially outer surface of the plies previously wound onto and now carried on the drum assembly by the bead placing assemblies, one of which is carried concentrically outwardly of each ply ring assembly.

The end of each ply ring assembly that engages the drum assembly is provided with a resiliently mounted radially outwardly flared grip ring and one or more ply-down fingers which cooperate to tuck that portion of the wound ply which overhangs the end of the drum assembly into the ply ring assembly and then secure the ply tightly to the edges of the drum assembly while the bead is automatically positioned by the concentric bead placing assembly. The bead bundle itself is selectively movable axially of the ply ring assembly on which it is carried by an annular bead engaging ring on the bead placing assembly. The bead engaging ring is slidably moved along the outer surface of the ply ring assembly by an anti-binding interacting connection between the driving means and the bead engaging ring to position the bead bundle beyond the flared gripping ring and onto the radially outer surface of the ply itself at a predetermined position.

Although the invention is particularly adapted to the building of so-called "radial ply casing" tires of the truck and tractor type, it will be evident that the invention is readily adaptable to the building of all conventional single bead tires, as well.

In the drawings:
FIG. 1 is a front elevational view of the ply ring assemblies, drum assembly, and other components of a tire building machine according to the invention in the static or rest position;
FIG. 2 is a front view, following sequentially after FIG. 1, showing the machine components in the dynamic condition of becoming engaged and interlocked mechanically, prior to commencement of initial tire building operations;
FIG. 3 is a similar view following sequentially after FIG. 2, showing the interlocked components during the machine's next automatic operation, the mechanical stitching together of the tire fabric plies which have been manually applied prior to this operation;

FIG. 4 is a further sequential view showing the machine components becoming disengaged immediately subsequent to the operation shown in FIG. 3;

Figures 5, 6:
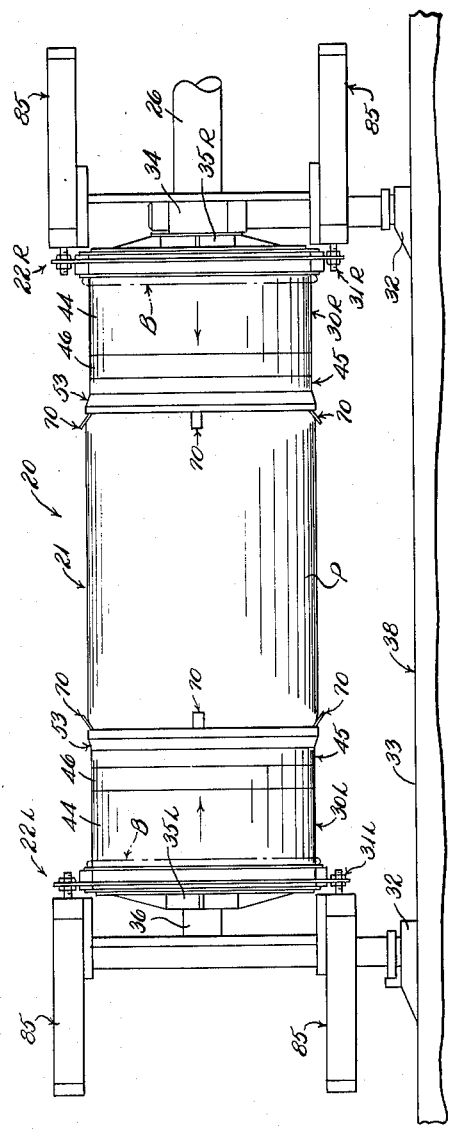
FIG. 5 illustrates the next step, the return of the ply ring assemblies to an interlocking position with the tire building drum assembly, and, in this view, the ply guide fingers are shown in operative relation to the tire fabric plies on the surface of the drum assembly.
Figure 7:
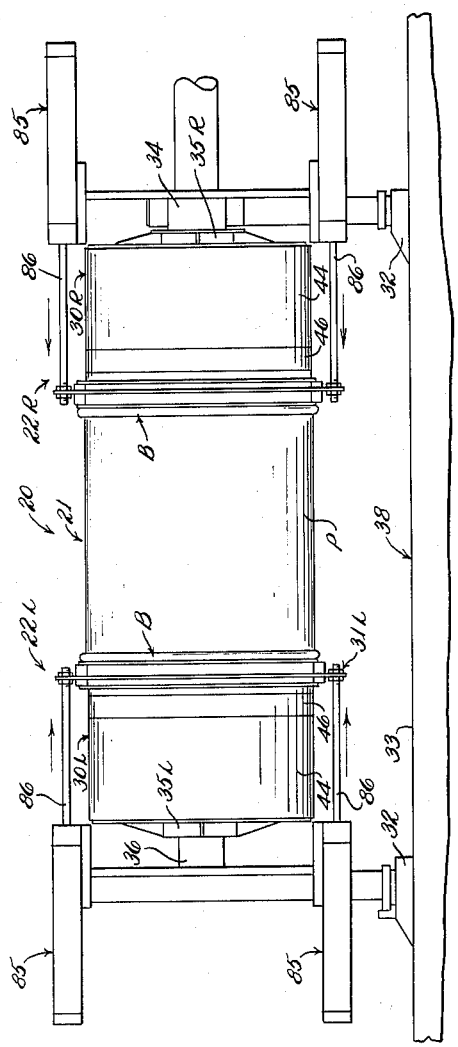
Figure 8:
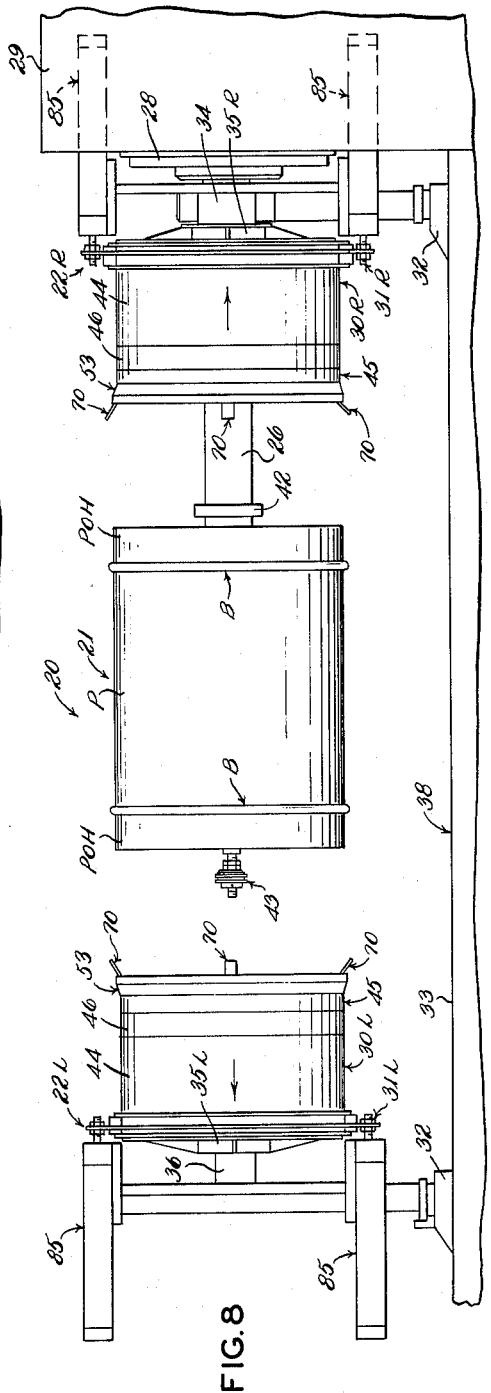
Figure 9:
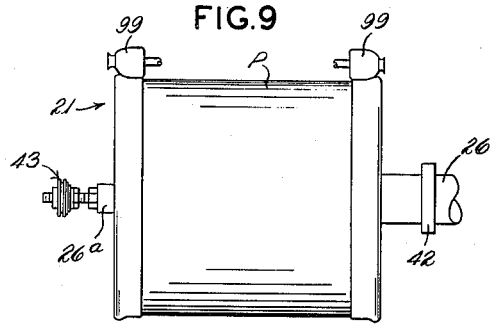
Figure 10:
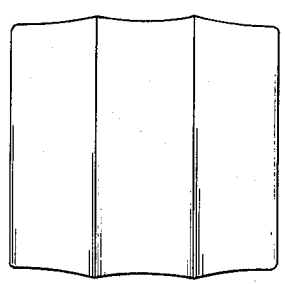
Figure 14:
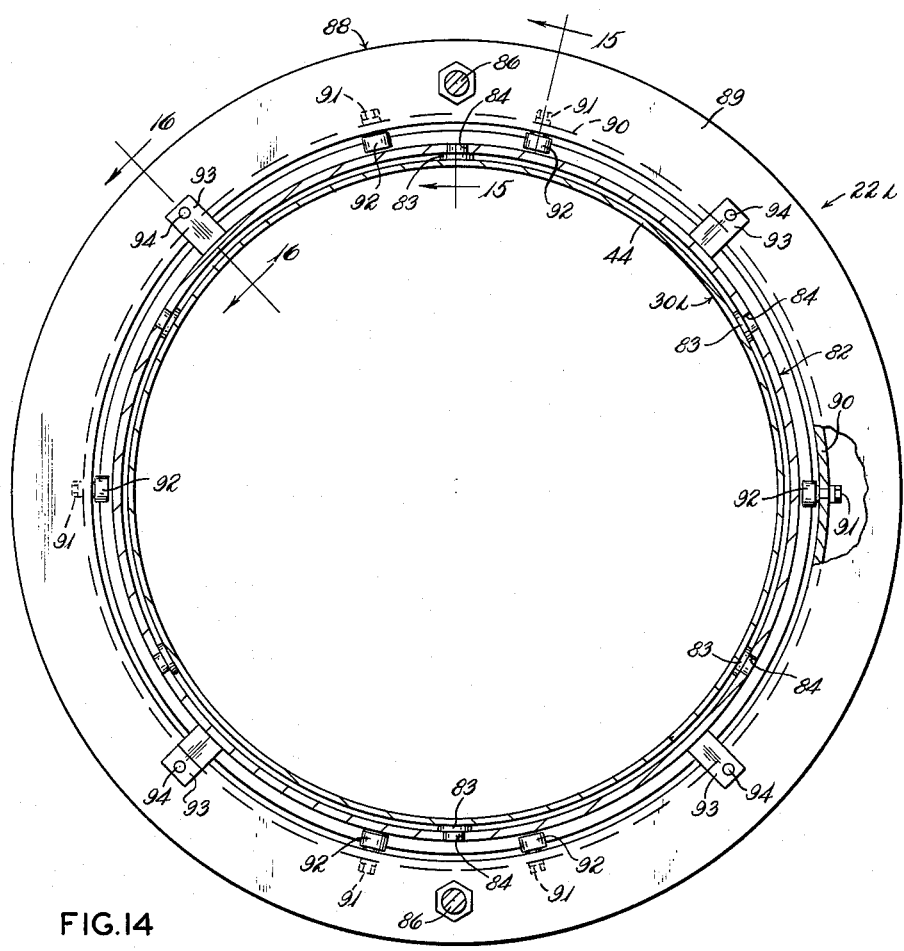

FIG. 6, another front view, shows the beginning of the next step, the inward travel of the annular bead placing assemblies, with tire bead-wire bundles intact, over the bare cylindrical ply rings toward the fabric-covered drum assembly;

FIG. 7 illustrates the terminus of inward travel begun by the bead placing assemblies in the view of FIG. 6;

FIG. 8 illustrates the final phase of the bead setting operation, the retracting of bead placing and ply ring assemblies from contact with the drum assembly, bead-wire bundles having been precisely positioned over the tire fabric on the drum assembly;

FIG. 9 is a top view of the tire building drum assembly during the next operation, showing acorn-shaped stitching devices in contact with the fabric edges which have previously been turned up and folded over the bead bundles;

FIG. 10 shows the uncured tire band after all tire building operations have been performed;

FIG. 11 is a longitudinal section of one of the co-axially mounted ply ring and bead ring assemblies;

FIG. 12 is another longitudinal section similar to FIG. 11, except that the ply ring and bead placing assemblies are shown in contact with the drum assembly;

FIG. 13 is a schematic longitudinal part-section of the ply ring assembly interlocked with the fabric-covered drum assembly, showing the placement of the bead-wire bundle by the bead placing assembly;

FIG. 14 is substantially a section end-view taken on line 14—14 in FIG. 11;

FIG. 15 is a section taken at line 15—15 in FIG. 14;

FIG. 16 is a section taken at line 16—16 in FIG. 14;

FIG. 17 is a part section detail of the ply-down guide ring shown in FIG. 13; and FIG. 18 is an exploded view of FIG. 17.

Referring particularly to FIG. 1 of the drawings, the tire building machine is indicated generally by the numeral 20. The major components of the tire building machine 20 are the drum assembly 21, the inboard pedestal assembly 22R, and the outboard pedestal assembly 22L.

The drum assembly 21 comprises a radially expansible cylindrical shell 24 having a peripherally beveled edge 25 and being mounted and nonrotatably secured by spoke linkage and hub means to the supporting and power shaft 26 arbored in a cantilevered thrust bearing 28 mounted on the main housing 29 of the machine and selectively driven to rotate the drum assembly by power means not shown.

The inboard pedestal assembly 22R and the outboard pedestal assembly 22L each carry a ply ring assembly 30 and a bead placing assembly 31. Each pedestal assembly 22 has a base, or sled, 32, slidably supported on a sled track 33 to permit the ply ring assembly 30 to be moved axially into and out of engagement with the drum assembly 21. The inboard pedestal assembly 22R has a sleeve bearing 34 for slidable engagement with the drum supporting shaft 26.

The inboard ply ring assembly 30R itself is mounted on shaft 26 for free rotation by a hub bearing 35R.

The outboard ply ring assembly 30L is similarly mounted for free rotation by providing a stub shaft 36 on outboard pedestal assembly 22L upon which hub bearing 35L can freely rotate.

The ply ring assemblies 30 are controllably movable into and out of engagement with the drum assembly 21 by translation means, indicated generally by the numeral 38. The translation of the pedestal assemblies 22 is preferably affected by a fluid actuated, double rod cylinder 39. Each rod 40 is connected to its respective sled 32 by a clevis 41. The stroke or axial translation, of the inboard pedestal assembly 22R toward the drum assembly 29 is controlled by an adjustable stop collar 42 on shaft 26 which cooperates with the suitable stop means, not shown, within the cylindrical inboard ply ring assembly 30R.

The actual translation of the outboard pedestal assembly 22L is similarly controlled by a pilot shaft extension 43 fixed to the outer end of a shaft 26, shown as of a reduced diameter, as at 26A. The cooperation of these stop means 42 and 43 is more fully hereinafter explained in conjunction with the description of the mechanism affecting the ply-down operation.

Each ply ring assembly 30 comprises a cylindrical shell section 44, secured to the hub 35, and cylindrical ply-down section 45 connected to the shell section 44 by one or more spacer rings 46. The ply-down section 45 is so constructed and arranged as to frictionally engage the respective beveled peripheral edge 25 of the drum assembly 21 to cause the ply ring assembly 30 to rotate with the drum assembly 21 when engaged, as shown in FIG. 2.

Referring particularly to FIGS. 11 and 12, the ply-down section 45 has an annular nose cone 48 rigidly secured to the outer edge of the shell section 44 or spacer ring 46, as shown. The enlarged detail of FIGS. 17 and 18 depicts the ply-down section 45 to best advantage and shows that the annular nose cone 48 is generally wedge shaped or trapezoidal in cross section with a recess or notch 49 in the radially outer side to receive the spacer ring 46 which may be welded or otherwise secured thereto. The radially outer surface 50 of the nose cone 48 is preferably aligned with the outer cylindrical surface of the remainder of the ply ring assembly to facilitate positioning of the bead bundle as will be hereinafter more fully described. The parallel sides 51 and 52 of the trapezoidal section provide engaging surfaces for maintaining the engaging means, indicated generally by the numeral 53, in fixed axial position relative to the remainder of the ply ring assembly 30.

The engaging means 53 has a stop block 54 spaced apart from and joined to the radially inclined grip ring 55 by flared hoop spring 56 which imparts a degree of resiliency to the grip ring 55 when it is operatively positioned on the ply-down assembly.

The fourth, or radially inward, annular face 58 of nose cone 48 is radially outwardly inclined and cooperates with a similarly radially outwardly inclined face 59 on the radially outer side of stop block 54 to facilitate snapping the engaging means into position by axial movement relative to the ply ring assembly 30. When the engaging means 53 has been snapped into position the engaging surface 51 on nose cone 48 mates with the radial engaging surface 60 on stop block 54; the radially inclined surface 58 on nose cone 48 mates with the radially inclined surface 61 on grip ring 55; and, the radial stop shoulder 62 on grip ring 55 abuts the second parallel face 52 of trapezoidal stop block 54 to maintain the engaging means in positive axial position. The cooperative engagement of the engaging means 53 with the nose cone 48 together with the particular configuration of the grip ring 55, causes the grip ring 55 to assume a flared or radially inclined orientation with respect to the remainder of the cylindrical ply ring assembly. The radially inner surface 63 of the grip ring 55 is radially inclined to cooperate with the beveled edge 25 on drum assembly 21 and the radially outer inclined guiding surface 64 terminates at its outer extremity in an axially oriented annular centering shelf 65.

To prevent the engaging means 53 from rotating relative to the remainder of the ply-down assembly, one or more Allen screws 66 extend through nose cone 48 and are received in appropriate bores 67 in the grip ring 55.

As best seen in FIGS. 11 and 12, the tuck-in assembly, indicated generally by the numeral 68, which cooperates with the ply-down section 45, as will be more fully understood in conjunction with the operation hereinafter more fully described, is positioned concentrically inwardly of the ply-down section 45 and comprises a disc base 69 positioned perpendicularly with respect to the longitudinal axis of the ply ring assembly 30 and from which extends a plurality of flat spring ply-down fingers 70. It has been found that at least three such fingers spaced at 120° intervals around the said disc base 69 are required for satisfactory operation, although the exact number used is discretionary. Each ply-down finger 70 is crooked or bent in dog leg fashion to provide an axial extension portion 71 and a radially flared camming portion 72 which terminates at its outer end in a curved guide portion 73.

The base 69 and attached fingers 70 are mounted for axial translation relative to the ply-down assembly 45 on axial guide shafts 74 which extend longitudinally of the ply-down assembly 45 from the spider 75 connecting the hub 35 to the shell 44. A helical compression spring 76 is positioned around each guide shaft 74 to bias the base 69 to the outermost position away from spider 75, as controlled by the position of stop collars 78. This position is preferably chosen so that the camming portion 72 of the ply-down fingers 70 extends in close proximity past the axial edge of grip rings 55 and the guide portion is positioned radially outwardly of the centering shelf 65. The inmost position of base 69 relative to spider 75 may be controlled by a stop pin 79 extending outwardly from spider 75.

Attached to and extending outwardly from the central axis of the base 69 and on the same side thereof as fingers 70 is a pilot sleeve 80 which cooperates with pilot shaft extension 43 to effect desired axial translation of the tuck-in assembly 68.

The details of the annular bead placing assembly 31 are best shown in FIGS. 13, 15 and 16. The bead placing assembly 31 comprises a channel-in-cross-section annular bead engaging ring 82 which slidably rides on the outer surface of shell 44, spacer ring 46 and a section of ply-down portion 45 by a series of circumferentially spaced grommet bushings 83 press fitted into suitable retaining bores 84.

This bead engaging ring 82 is selectively reciprocated along the radially outer surface of the ply ring assembly 30 by diametrically opposed fluid cylinders 85 operating reciprocating rods 86. Attached to the outer end of rods 86 is an annular flange ring 88 having an L-shaped cross section. The rods 86 are attached to the radially oriented leg 89 and interacting means are operatively connected to the axially oriented leg 90. One such interacting means comprises a spindle 91 on which is rotatably mounted a roller bushing 92. The second interacting means is a foot block 93 attached as by bolts 94, one to the axial leg 90 and a second to the radial leg 89. A plurality of foot blocks 93 and roller bushings 92 are circumferentially spaced around the periphery of the flange ring 88 and received between the legs 95 and 96 of channel-shaped bead engaging ring 82.

The width of the foot block 93 is less than the dimension between legs 95 and 96 and is placed in axial relation to roller bushings 92 so as not to contact the legs when the roller bushing 92 engages leg 96. By locating the roller bushings symmetrically on either side of the push rods 86, as best shown in FIG. 14, thrust alignment is assured. That is, the bead engaging ring can slide a bead bundle "B" along the ply ring assembly away from the spider and toward the drum assembly without binding because of the spacing and configuration of the interacting means. To return the bead engaging ring, the mere engagement of the fixed foot block 93 with leg 95 is sufficient.

Operation

Layers or plies of rubber impregnated ply fabric "P" are applied circumferentially to the drum and ply ring assemblies during the sequence of operations normally involved in the construction of an uncured tire band. These plies are wrapped on to the cylindrical core, formed by the engaged drum and ply ring assemblies, from normal servicing means positioned at the back of the tire building machine itself.

As can be seen from FIGS. 11 and 12, when the pilot extension or collar 29 engages a similar sleeve within the inboard ply ring assembly, shaft 43 engages the pilot sleeve 80; and forces the base 69 of the tuck-in assembly 68 toward the spider 75; the camming portion 72 of the ply-down finger 70 rides along the axial edge of grip ring 55 retracting the guide portion 73 of the finger 70 radially and axially within the cyindrical portion of the ply-down assembly 30 until the assemblies are fully engaged. Thus, when the drum and ply ring assemblies are engaged, as in FIG. 2, a cylindrical core is formed to permit ready application of the fabric ply "P."

After these basic plies are applied, mechanical stitchers 98 sew the plies together (FIG. 3) in order to smooth out wrinkles and expel air pockets between the individual plies. This stitching operation also promotes better adhesion between the plies.

The next sequential operation involves the placement of rubber and fabric covered bead wire bundles "B" over the plies on the drum surface. To do this the pedestal assemblies 22 are retracted along rail 32 away from the drum assembly 21 (FIG. 4). Plies "P" remain on the drum assembly 21, shown in phantom, and leave the circumferential edges of the plies, known in the art as ply overhangs indicated as "POH," extending beyond the drum edges.

After retraction, the pedestal assemblies 22 are returned so that the ply ring assemblies 30 move toward operative engagement with the ply covered drum assembly 21, as shown in FIG. 5. The ply overhangs "POH" are contacted by guide portions 73 of fingers 70 and guided inside the cylindrical ply ring assemblies 30L and 30R. As the assemblies are moved toward engagement, through the plies "P," once again the ply-down fingers 70 retract radially and axially inside the ply ring assembly 30, as described above, and the grip rings 55 register precisely against a portion of the beveled edges 25 of the ply covered drum assembly 21 to lock the plies thereagainst.

The bead bundles "B," which had been previously placed over the ply ring assembly 30 out of the way of the portion on which the plies would be wound, are then driven toward the drum assembly 21 by actuation of the fluid pressure cylinders 85. The bundes "B" loosely slide across the radially outer surface of shells 44, spacer rings 46, nose cones 48 and on to the grip rings 55. As each bundle "B" is moved axially along the increasing diameter of guiding surface 64 it attains its fully annular configuration and then slides along the centering shelf 65 to repose on the radially outer surface of the wound fabric plies "P" (FIG. 7), which may be in a plane lying within the beveled edge 25, as shown in FIG. 13 of the cylidrical shell 24.

The budles "B" are thus registered with the drum and ply-down assemblies and are coaxial with the wound plies to prevent bead run-out and assure concentricity of bead in a tire shaped and vulcanized from the band so made.

After the bead bundles "B" have been precisely positioned over the ply fabric "P," the ply ring assemblies 30 are again retracted from engagement with the drum assembly 21, and the circumferential edges POH of the plies overhanging the drum are folded and stitched over and around the bead bundle "B."

As shown in FIG. 9, acorn stitching tools 99 operatively contact the ply overhangs POH which have previously been turned up and folded over the bead wire bundles "B." This wrapping and stitching operation locks the beads within the ply fabric carcass and works out air pockets and wrinkles.

Further ply application and stitching operations follow. The tread and side wall rubber is wrapped around the carcass and stitched thereto. The uncured tire band is then removed from the expansible drum assembly 21, ready for shaping and vulcanizing.

It is therefore apparent that the practice of the process and the construction of a ply-down and bead setting apparatus according to the concepts herein disclosed accomplish the objects of the invention.

What is claimed is:

1. In a machine for building tires by winding fabric plies onto a core, a ply-down and bead setting apparatus comprising, a drum assembly, an axially aligned annular ply ring assembly movable into and out of engagement with said drum assembly, said engaged ply ring and drum assemblies forming the cylindrical core upon which tire plies can be wound, gripping means on the edge of said ply ring assembly, a retractable tuck-in assembly mounted on the drum assembly side of said ply ring assembly, and a bead placing assembly positioned concentrically of said ply ring assembly for positioning a bead bundle on the radially outer surface of the fabric wound on said drum assembly.

2. In a machine for building tires by wiking fabric plies onto a core, a ply-down and bead seating apparatus comprising, a rotatable drum, said drum having beveled edges, a ply ring assembly axially aligned with said drum movable into and out of engagement with said drum, a radially outwardly flared gripping means on said ply ring assembly, said gripping means resiliently mounted for engaging the respective beveled edge on said drum, a tuck-in assembly mounted on said ply ring assembly, said tuck-in assembly having a plurality of ply-down fingers extending radially outwardly of said ply-down assembly, means to retract said fingers as said ply-down assembly is brought into engagement with said drum, and a bead placing assembly positioned concentrically of said ply ring assembly for positioning a bead bundle on the radially outer surface of the fabric wound on said drum assembly.

3. In a machine for building tires by winding fabric plies onto a core, a ply-down and bead setting apparatus comprising, a drum assembly, an axially aligned annular ply ring assembly movable into and out of engagement with said drum assembly, a radially flared gripping means on the edge of said ply ring assembly for engaging a beveled edge on said drum assembly, a retractable tuck-in assembly mounted on the drum assembly side of said ply ring assembly, and a bead placing assembly positioned concentrically of said ply ring assembly for positioning a bead bundle on the radially outer surface of the fabric wound on said drum assembly.

4. In a machine for building tires by winding fabric plies onto a core, a ply-down and bead setting apparatus comprising, a rotatable drum, said drum having beveled edges, a ply ring assembly axially aligned with said drum and movable into and out of engagement with said drum, a resiliently mounted, radially outwardly flared gripping means on said ply ring assembly, said gripping means having a radially inner radially inclined surface for mating engagement with the beveled edges on said drum and a bead guiding surface on the radially outer side of said gripping means, a tuck-in assembly mounted on said ply ring assembly, said tuck-in assembly having a plurality of ply-down fingers extending radially outwardly of said ply-down assembly, means to retract said fingers as said ply ring assembly is brought into engagement with said drum, and a bead placing assembly positioned concentrically of said ply ring assembly for positioning a bead bundle on the radially outer surface of the fabric wound on said drum.

5. In a machine for building tires by winding fabric plies onto a core, a ply-down and bead setting apparatus comprising a rotatable drum, said drum having beveled edges, a ply ring assembly axially aligned with said drum, said ply ring assembly having a cylindrical shell portion and movable into and out of engagement with said drum, a gripping means on said ply ring assembly, said gripping means having a stop block and a grip ring spaced apart from and connected to each other by a flared hoop spring on the radially inner side thereof, said gripping means non-rotatably mounted on a nose cone on the edge of said ply ring assembly and inclined radially outwardly of said ply ring assembly, said grip ring having a radially inner radially inclined surface for mating engagement with the beveled edges on said drum and a bead guiding surface on the radially outer side of said gripping means, a tuck-in assembly mounted on said ply ring assembly, said tuck-in assembly having a plurality of ply-down fingers extending radially outwardly of said ply ring assembly, means to retract said fingers as said ply-down assembly is brought into engagement with said drum, and a bead placing assembly positioned concentrically of each said ply ring assembly for positioning a bead bundle on the radially outer surface of the fabric wound on said drum.

6. In a machine for building tires by winding fabric plies onto a core, a ply-down and bead setting apparatus comprising, a rotatable drum, said drum having beveled edges, a ply ring assembly axially aligned with said drum movable into and out of engagement with said drum, said ply ring assembly having a cylindrical shell portion in register with the outer surface of said drum, a resiliently mounted, radially outwardly flared gripping means on said ply ring assembly, said gripping means having a radially inner radially inclined surface for mating engagement with the beveled edges on said drum and bead guiding means on the radially outer side of said gripping means, a tuck-in assembly mounted on said ply ring assembly, said tuck-in assembly having a plurality of ply-down fingers, each finger having a portion extending radially outwardly of the cylindrical portion of said ply ring assembly and means to retract said ply-down fingers within said ply ring assembly, and a bead placing assembly positioned concentrically of said ply ring assembly for positioning a bead bundle on the radially outer surface of the fabric wound on said drum.

7. In a machine for building tires by winding fabric plies onto a core, a ply-down and bead setting apparatus comprising, a rotatable drum, said drum having beveled edges, a ply ring assembly axially aligned with said drum movable into and out of engagement with said drum, said ply ring assembly having a cylindrical shell portion in register with the outer surface of said drum, a resiliently mounted, radially outwardly flared gripping means on said ply ring assembly, said gripping means having a radially inner radially inclined surface for mating engagement with the beveled edges on said drum and a bead guiding surface on the radially outer side of said gripping means, a tuck-in assembly having a base, resilient ply-down fingers extending radially outwardly of said base past and adjacent to said gripping means, biasing means constantly urging said base toward a position whereby said fingers can extend radially beyond the cylindrical portion of said ply ring assembly and means to translate said base causing said fingers to axially and radially retract within said cylindrical portions, and a bead placing assembly positioned concentrically of said ply ring assembly for positioning a bead bundle on the radially outer surface of the fabric wound on said drum.

8. In a machine for building tires by winding fabric plies onto a core, a ply-down and bead setting apparatus comprising, a rotatable drum, said drum having beveled edges, a ply ring assembly axially aligned with said drum movable into and out of engagement with said drum, said ply ring assembly having a cylindrical shell portion in register with the outer surface of said drum, a resiliently mounted, radially outwardly flared gripping means on said ply ring assembly, said gripping means having a radially inner radially inclined surface for mating engagement with the beveled edges on said drum and a bead guiding surface on the radially outer side of said gripping means, a tuck-in assembly, said tuckin assembly having a base within said cylindrical shell of said ply ring assembly, a plurality of fingers attached to said base, each of said fingers having a camming portion extending radially outwardly past said gripping means and terminating in a curved guide portion, means to translate said base in one direction causing the camming portion to engage said gripping means and thereby retract said fingers radially and axially inwardly of said cylindrical portion of said ply ring assembly when said ply ring and drum assemblies are brought into engagement, and biasing means to translate said base in the opposite direction upon separation of said ply ring and drum assemblies, and a bead placing assembly positioned concentrically of said ply ring assembly for positioning a bead bundle on the radially outer surface of the fabric wound on said drum.

9. In a machine for building tires by winding fabric plies onto a core, a ply-down and bead setting apparatus comprising, a rotatable drum, said drum having beveled edges, a ply ring assembly axially aligned with said drum movable into and out of engagement with said drum, said ply ring assembly having a cylindrical shell portion in register with the outer surface of said drum, a resiliently mounted, radially outwardly flared gripping means on said ply ring assembly, said gripping means having a radially inner radially inclined surface for mating engagement with the beveled edges on said drums and a bead guiding surface on the radially outer side of said gripping means, a tuck-in assembly mounted on said ply ring assembly, said tuck-in assembly having a plurality of ply-down fingers extending radially outwardly of said ply ring assembly, means to retract said fingers as said ply-down assembly is brought into engagement with said drum, and a bead placing assembly, said bead placing assembly having an annular bead engaging ring positioned concentrically outwardly of the cylindrical shell portion of said ply ring assembly, power means to move said ring axially along said ply ring assembly.

10. In a machine for building tires by winding fabric plies onto a core, a ply-down and bead setting apparatus comprising, a rotatable drum, said drum having beveled edges, a ply ring assembly axially aligned with said drum movable into and out of engagement with said drum, said ply ring assembly having a cylindrical shell portion in register with the outer surface of said drum, a resiliently mounted, radially outwardly flared gripping means on said ply ring assembly, said gripping means having a radially inner radially inclined surface for mating engagement with the beveled edges on said drum and a bead guiding surface on the radially outer side of said gripping means, a tuck-in assembly mounted on said ply ring assembly, said tuck-in assembly having a plurality of ply-down fingers extending radially outwardly of said ply ring assembly, means to retract said fingers as said ply ring assembly is brought into engagement with said drum, and a bead placing assembly, said bead placing assembly having an annular bead engaging ring positioned concentrically outwardly of the cylindrical shell portion of said ply ring assembly, power means to move said ring axially along said ply ring assembly, first means for connecting said bead engaging ring to said power means for movement in one direction and second means for connecting said bead engaging ring to said power means for movement in a reverse direction.

11. In a machine for building tires by winding fabric plies onto a core, a ply-down and bead setting apparatus comprising, a rotatable drum, said drum having beveled edges, a ply ring assembly axially aligned with said drum movable into and out of engagement with said drum, said ply ring assembly having a cylindrical shell portion in registry with the outer surface of said drum, a resiliently mounted, radially outwardly flared gripping means on said ply ring assembly, said gripping means having a radially inner radially inclined surface for mating engagement with the beveled edges on said drum and a bead guiding surface on the radially outer side of said gripping means, a tuck-in assembly mounted on said ply ring assembly, said tuck-in assembly having a plurality of ply-down fingers extending radially outwardly of said ply ring assembly, means to retract said fingers as said ply ring assembly is brought into engagement with said drum, and a bead placing assembly, said bead placing assembly having an annular bead engaging ring positioned concentrically outwardly of the cylindrical portion of said ply ring assembly, means between said bead engaging ring and said shell portion for maintaining sliding engagement therewith, power means, and rotatable interacting means between said power means and said bead engaging ring to move a bead bundle contacted by said bead engaging ring along the cylindrical portion of each said ply ring assembly past the gripping means thereon and onto the radially outer surface of the fabric wound onto said drum.

References Cited by the Examiner

UNITED STATES PATENTS

| 2,455,038 | 11/1948 | Breth | 156—402 |
| 2,488,863 | 11/1949 | Haase | 156—402 |
| 2,609,311 | 9/1952 | Engler | 156—402 |
| 2,614,952 | 10/1952 | Kraft | 156—402 |
| 2,838,092 | 6/1958 | McMahon | 156—400 |

FOREIGN PATENTS 691,195  6/1953  Great Britain.

EARL M. BERGERT, *Primary Examiner.*

HAROLD ANSHER, ALEXANDER WYMAN,
*Examiners.*